UNITED STATES PATENT OFFICE.

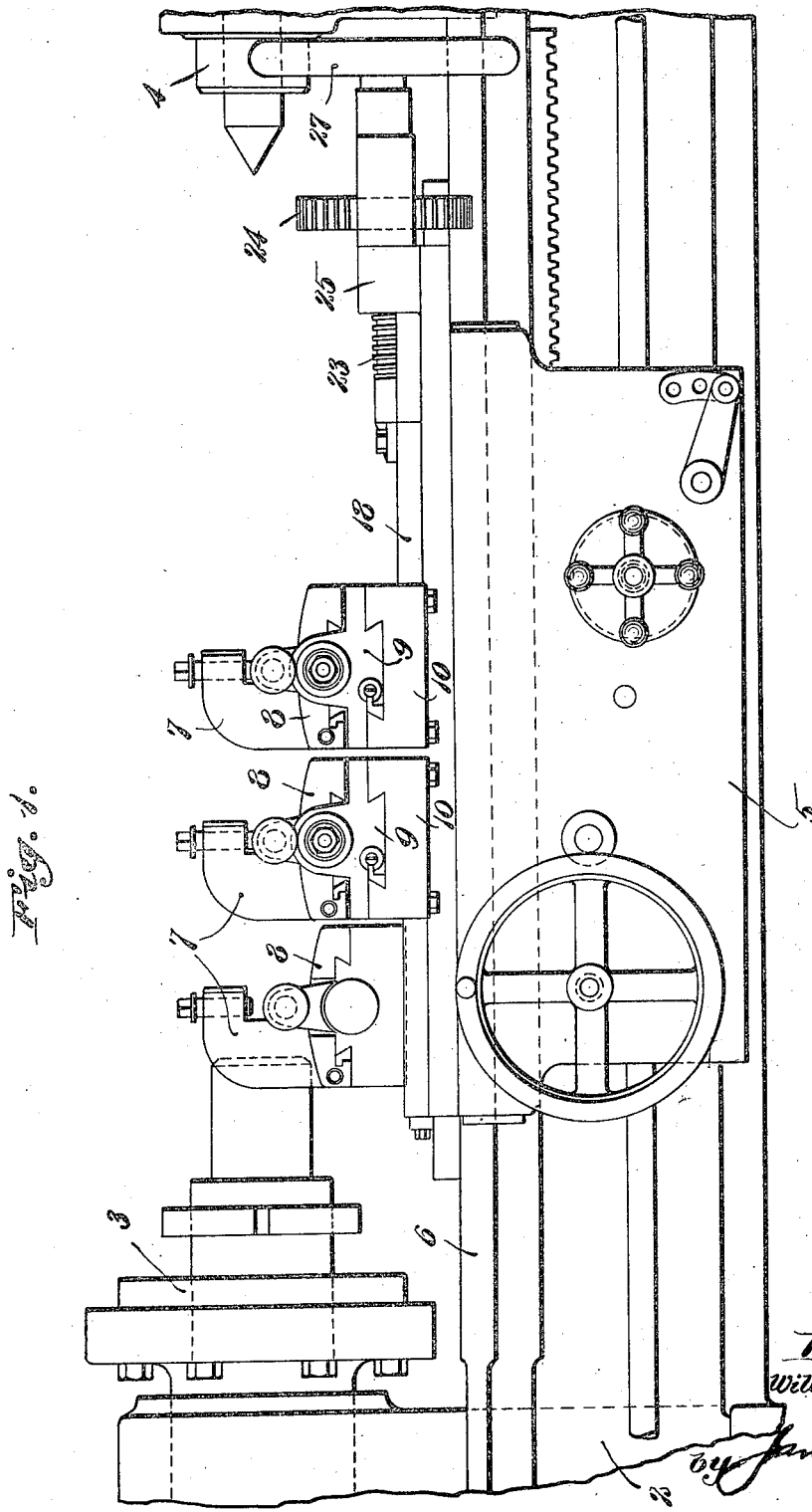

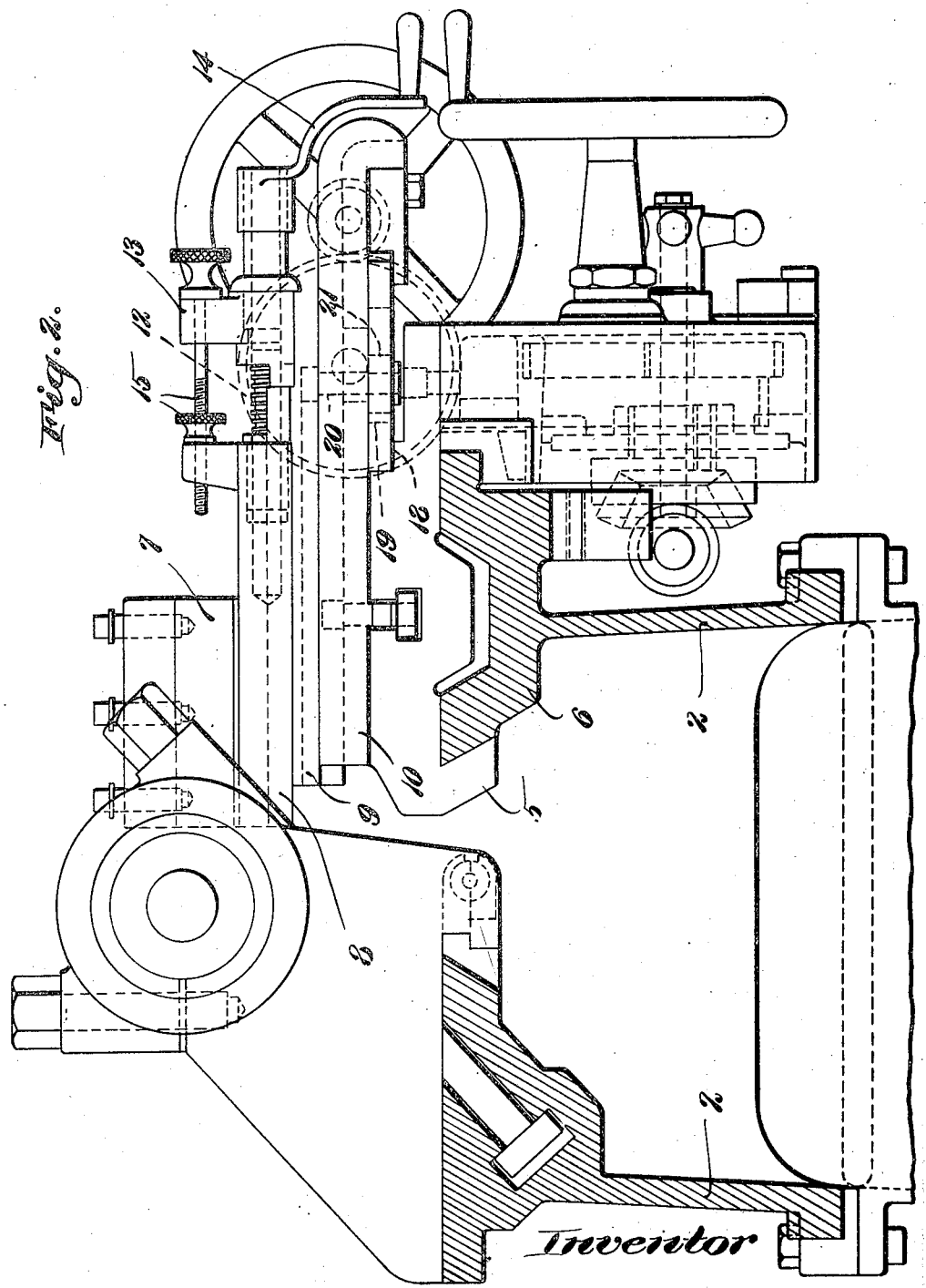

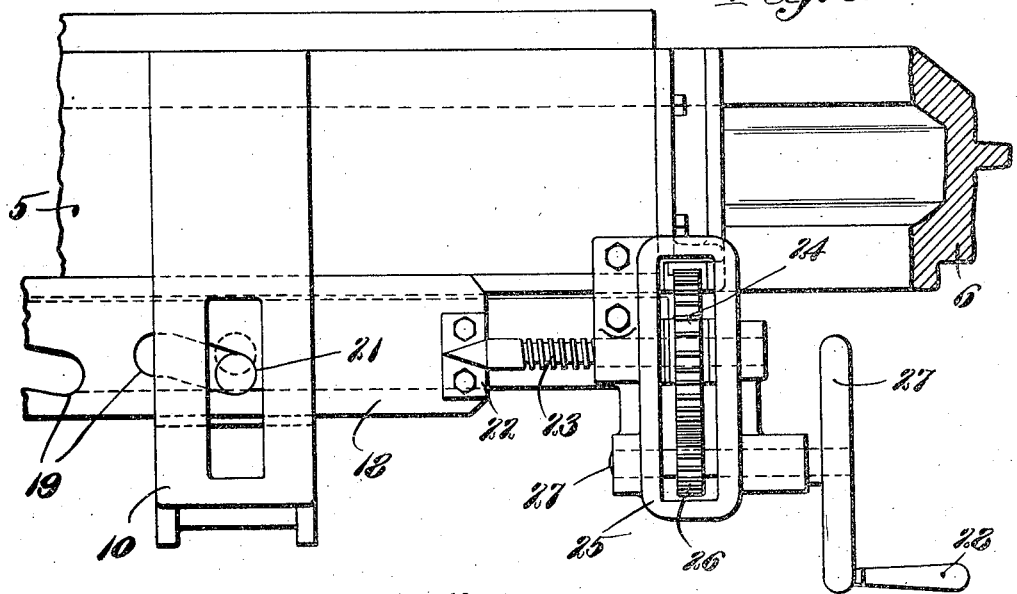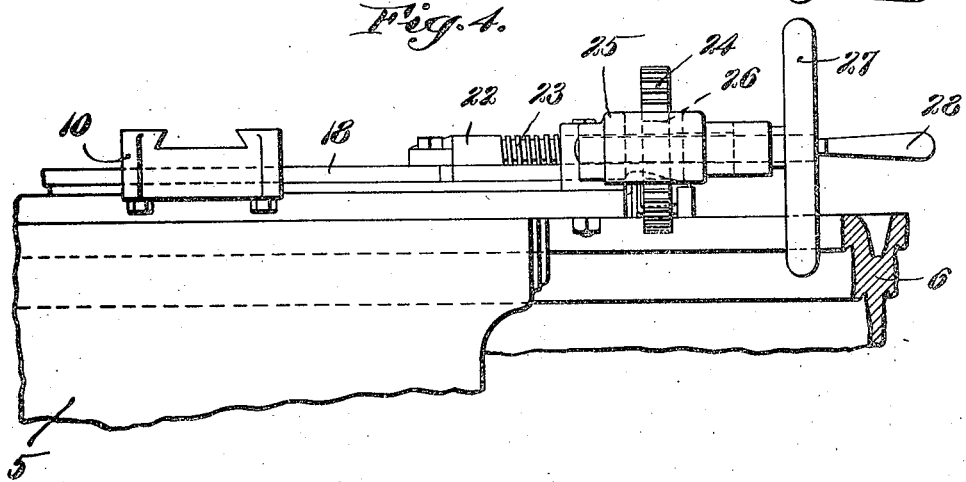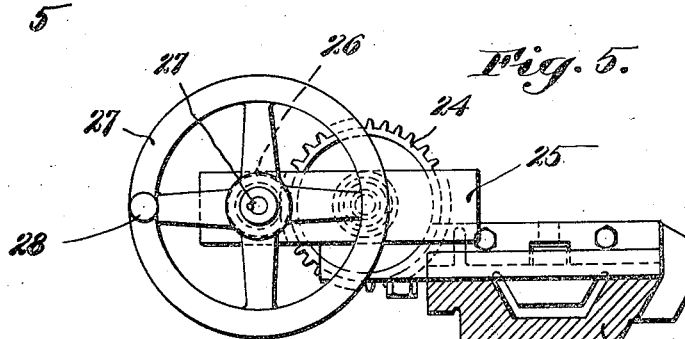

WILLIAM W. WALLACE, OF BUCYRUS, OHIO, ASSIGNOR TO RAYMOND C. PENFIELD, OF CHICAGO, ILLINOIS.

MULTIPLE-TOOL LATHE.

1,353,686. Specification of Letters Patent. Patented Sept. 21, 1920.

Application filed June 14, 1918, Serial No. 239,970. Renewed July 3, 1920. Serial No. 393,984.

*To all whom it may concern:*

Be it known that I, WILLIAM W. WALLACE, a citizen of the United States, and resident of Bucyrus, in the county of Crawford and State of Ohio, have invented an Improvement in Multiple-Tool Lathes, of which the following description, in connection with the accompanying drawings, is a specification, like letters on the drawings representing like parts.

The extraordinary demand for increased production of munitions and equipment of various kinds which has been brought about by the war has tremendously increased the demands on the machines used to produce these supplies. Not only has this demand required machines capable of increased production, but is has required machines more completely automatic than those heretofore used, both for the purpose of insuring greater uniformity and accuracy in the product and also for the purpose of reducing the amount of skilled labor required to operate and care for the machines. This latter requirement has recently become particularly important since the available supply of skilled labor has been practically exhausted.

The present invention is concerned particularly with lathes and similar machine tools and it aims to improve machines of this type with a view to meeting these additional requirements. As is well known by those skilled in this art, it is now a common practice in turning shells for guns and in operating on other articles in lathes, to use several tools spaced apart in the direction of the axis about which the work is being revolved, so that each tool will be required to traverse only a relatively small section of the work and the time thus required to machine the entire piece of work will be correspondingly reduced. It has been necessary, however, in the constructions heretofore proposed to adjust each tool independently of the others thus requiring much time and skill to secure uniformity in adjustment of the several tools. The present invention provides a common adjustment for tool holders of the character used in lathes and, in its preferred embodiment, provides an arrangement whereby a plurality of tools may be adjusted simultaneously. This arrangement not only reduces the time required on the part of the workman to make the initial adjustment of the tools, but insures absolute uniformity and accuracy in the making of this adjustment and enables one workman to handle more machines than otherwise would be possible.

To the accomplishment of the object above defined the invention involves a novel organization of elements and peculiar combinations and arrangements of parts, the nature of which will be readily understood from the following description and the novel features of which will be particularly pointed out in the appended claims.

Referring now to the accompanying drawings:

Figure 1 is a side elevation of only those parts of a lathe, the illustration of which is necessary to an explanation of the present invention;

Fig. 2 is a cross sectional view through Fig. 1;

Fig. 3 is a plan view of a part of the adjusting mechanism provided by this invention;

Fig. 4 is a side elevation of the parts shown in Fig. 3; and

Fig. 5 is an end view of the parts shown in Figs. 3 and 4.

The machine shown in the drawings comprises a bed 2 and the usual mechanism for supporting and rotating the work comprising a head stock 3, a tail stock 4 and suitable driving mechanism for the head stock. The machine is also equipped with a tool carriage 5 which may be fed either automatically or by hand in the usual manner, this carriage being mounted in suitable ways 6 for feeding movements in a direction parallel to the axis about which the work is rotated. This entire mechanism is substantially like that of the usual commercial lathes in common use and any further description of the details of this construction consequently is unnecessary.

A plurality of tool holders 7 are supported on the carriage 5 for adjustment transversely to the direction of the feeding movement of the carriage. This arrangement is best shown at Figs. 1 and 2, from which it will be seen that the tool holder 7 is carried by a slide 8 that is mounted for movement at right angles to the axis of rotation of the head stock spindle and is supported on another slide 9 mounted in a bracket 10 for movement in the same direction as the slide 8. The bracket 10 is secured to the tool carriage 5. A screw adjustment is interposed between the slides 8 and 9, as best shown in Fig. 2, and comprises a shaft 12 provided with a male thread taking into a female thread in the slide 8, the shaft being mounted for rotation in a bracket 13 secured to the slide 9 and held in said bracket against movement longitudinally of its axis. A handle 14 fast on the forward end of the shaft 12 affords a convenient means of rotating the shaft and thus moving the slide 8 forward or backward on the slide 9. A screw threaded stop 15, Fig. 2, is provided between the slides 8 and 9 and affords a convenient means for these parts in their adjusted positions. This mechanism provides for a relative adjustment between the slides 8 and 9 in a direction transversely of the direction of feed of the carriage and of the axis of rotation of the work.

The mechanism provided by this invention affords means for simultaneously adjusting all the tool holders in a direction transversely of the direction of feed of the carriage. This mechanism comprises a cam plate 18, Figs. 3 and 4, having a plurality of cam slots 19 cut in it, one slot for each tool holder. Each slide 9 has a stud 20 secured therein and projecting downwardly through a slot in the bracket 10 and carries a roll 21 that runs in one of the cam slots 19. The cam plate 18 is guided in the tool carriage 5 for reciprocating movement in a direction parallel to the direction of the feeding movement of the carriage and a screw threaded mechanism is provided for sliding the cam plate in this direction. This mechanism comprises a bracket 22 bolted to the plate 18 and having a screw threaded rod 23 projecting therefrom. A gear 24 has a centrally threaded aperture to receive the bolt 23 and rotates on this bolt but is held against movement longitudinally of the bolt by the walls of a bracket 25 that is bolted to the tool carriage, the gear being mounted to rotate between these walls. This gear is driven by a pinion 26 fast on a shaft 27 mounted in suitable bearings in the bracket 25 and carries a hand wheel 27 provided with a handle 28 by means of which it may be rotated.

It is obvious that, since the bracket 25 holds the gear 24 against movement longitudinally of the axis of the threaded shaft 23, the rotation of this gear through the movement of the handwheel 27 will operate through the member 23 to slide the cam plate 18 backward or forward on the tool carriage in a direction depending on the direction of rotation of the handwheel. The motion thus imparted to the cam plate will operate through the cam rolls 21 and the studs 20 to move all the tool holders toward or from the axis of rotation of the work.

It will now be understood that in using the machine the shell or other piece of work to be machined is set into the machine in the usual way, the cam plate 18 at this time being in the position in which it is shown in Fig. 4 so that it holds all the tool holders in their retracted or backward positions. The tool holders previously have been adjusted through the adjusting devices 12, 14 and 15 so that the advancing movement given to them by the cam plate will bring all the tools into exactly the positions that they should occupy with reference to the work. Consequently when the work has been properly placed it is merely necessary for the workman to rotate the handwheel 27 in a direction to slide the cam plate 18 toward the right, as the parts appear in Figs. 3 and 4, thus moving this plate to the right hand limit of its stroke. This movement will advance all the tool holders simultaneously, as above described, into their forward or operative positions. Since the extent of this advancing movement is determined by the design of the cam slots 19, any possibility of an inaccurate adjustment of the tools is avoided provided, of course, that the initial adjustment between the slides 8 and 9 has been properly made. It should be noted, however, that this adjustment between the parts 8 and 9 has to be made only once for a given size of work and does not have to be changed again until it is necessary to change the tools or until the machine has to be readjusted for a new run of work.

After the turning operations have been completed on a given piece of work the workman or attendant rotates the handwheel 27 far enough to move the cam plate 18 back into the position in which it is shown at Fig. 4 thus withdrawing all the tools simultaneously from the work. The finished piece of work is then removed from the machine and a new piece is substituted for it, after which the operations above described are repeated.

Since the feeding movement of the tool holders in a direction parallel to the axis of rotation of work is practically always produced automatically, the machine requires no attention on the part of the workman in changing from one piece of work to another excepting to operate the handwheel 27 to withdraw the tools after one piece of work has been turned and then to advance these tools again to adjust them for the turning of the next piece. Consequently one workman can attend to a relatively large number of machines. It is obvious that the initial adjustment of the tool holder with reference to the slide 9 can be made by a skilled operator and that the attention thereafter required by the machine up to the time that it becomes necessary to make this adjustment again can all be performed by relatively unskilled labor, since the adjustment made through the handwheel 27 and cam plate 18 requires no skill, the extent of this adjustment being determined entirely by the design of the cam slot 19. It will also be evident that the cam slots 19 may be of different designs if it should be desirable to advance one of the tools farther than another. Preferably the cam slots are designed to have a short dwell at the forward end of each slot so as to provide a better construction for resisting the thrust of the work on the tools, or, in other words, to form a more efficient means for maintaining the holders in their adjusted positions.

While I have herein shown and described the best embodiment of the invention of which I am at present aware, it is obvious that this embodiment may be variously modified within the skill of the mechanic and the discretion of the designer without departing from the spirit or scope of the invention as claimed.

What is claimed as new, is:

1. A lathe having means for supporting and rotating the work about an axis, in combination with a tool carriage, a plurality of tool holders mounted on said carriage for adjustment transversely of said axis, screw threaded adjusting means, and cam means through which said adjusting means is operative to adjust said tool holders simultaneously relatively to said carriage.

2. A lathe having means for supporting and rotating the work about an axis, in combination with a tool carriage, a plurality of tool holders mounted on said carriage for adjustment transversely of said axis, a reciprocating cam plate mounted on said carriage and connected with said tool holders to adjust them simultaneously in a direction transverse to said axis, and screw threaded means for moving said cam plate to effect said adjustment.

In testimony whereof I have signed my name to this specification in the presence of two subscribing witnesses.

W. W. WALLACE.

Witnesses:
V. M. VIRTUE,
S. T. NICHOLSON.